United States Patent
Muller et al.

(10) Patent No.: US 7,631,930 B2
(45) Date of Patent: Dec. 15, 2009

(54) VEHICLE SEAT HAVING AN ADJUSTABLE HEAD RESTRAINT

(75) Inventors: Karsten Muller, Ingolstadt (DE); Stefan Brunner, Freising (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/767,712

(22) Filed: Jun. 25, 2007

(65) Prior Publication Data

US 2008/0001456 A1    Jan. 3, 2008

(30) Foreign Application Priority Data

Jun. 30, 2006    (DE)    ........................ 10 2006 030 258

(51) Int. Cl.
*A47C 1/02*    (2006.01)
(52) U.S. Cl. ........................ 297/61; 297/408
(58) Field of Classification Search ................ 297/404, 297/408, 410, 61
See application file for complete search history.

(56) References Cited

U.S. PATENT DOCUMENTS

| | | | | |
|---|---|---|---|---|
| 2,466,553 A | * | 4/1949 | McDonald, Jr. | 297/404 |
| 3,563,602 A | * | 2/1971 | Ohta et al. | 297/410 |
| 3,929,374 A | * | 12/1975 | Hogan et al. | 297/61 |
| 5,445,434 A | | 8/1995 | Kohut | |
| 5,860,703 A | * | 1/1999 | Courtois et al. | 297/410 |

FOREIGN PATENT DOCUMENTS

| | | |
|---|---|---|
| DE | 19603911 | 8/1997 |
| DE | 19714283 | 11/1997 |
| DE | 19632560 | 2/1998 |
| DE | 10043923 | 4/2002 |
| GB | 2302706 A | 1/1997 |
| GB | 2418850 A1 | 12/2006 |

OTHER PUBLICATIONS

Great Britain Combined Search and Examination Report, Oct. 29, 2007.

* cited by examiner

*Primary Examiner*—Milton Nelson, Jr.
(74) *Attorney, Agent, or Firm*—Brooks Kushman P.C.

(57) ABSTRACT

A vehicle seat assembly includes a seat bottom and a seat back connected to the seat bottom. A reclining mechanism is configured to adjustably position the seat back. A head restraint assembly includes a head restraint and one or more supports pivotally connected to and cooperating with the seat back to position the head restraint adjacent an occupant's head. A headrest adjustment mechanism includes a spring connected to the one or more supports that biases the shaft from an unlocked toward a locked position and a release mechanism cooperating with the one or more supports which allows the one or more supports to be unlocked so that the headrest can be adjusted relative to the seat back.

16 Claims, 4 Drawing Sheets

VEHICLE SEAT HAVING AN ADJUSTABLE HEAD RESTRAINT

CROSS-REFERENCE TO RELATED APPLICATIONS

This application claims foreign priority benefits under 35 U.S.C. § 119(a)-(d) to DE 10 2006 030 258.3, filed Jun. 30, 2006, which is hereby incorporated by reference in its entirety.

BACKGROUND OF THE INVENTION

1. Field of the Invention

The present invention generally relates to improvements in vehicle seat assemblies, and more particularly to a vehicle seat having an adjustable head restraint assembly.

2. Background Art

Vehicle seat assemblies are provided in the passenger seating area of a vehicle in a variety of configurations. For example, independent bucket seats may be mounted in various positions around the passenger seating compartment. Alternatively, bench seats that may accommodate more than one passenger can extend at least partially if not fully across the width of a passenger seating area.

Many seat assemblies include a headrest positioned adjacent a top or upper portion of a seat back. The headrest is typically vertically adjustable relative to the seat back to provide head support for the seat occupant while the vehicle in motion. The headrest assembly provides additional support to the occupant of the vehicle seat and, in the case of a vehicle collision, provide support for the occupant's head and neck.

Conventional headrest adjustment mechanisms can make adjustment of the height or position of the headrest assembly difficult based on the design of the passenger compartment or limitations of physical abilities of the vehicle occupants. Many vehicles today also include seat assemblies that fold down to provide increased cargo area. One limitation of many of these seats is the need to remove the head restraint prior to folding the seat. The head restraint must then be stowed in some generally inconvenient location. If the head restraint is stowed outside the vehicle, it may not be available when the seat is returned to its upright position.

Other head restraints can remain attached to the seat assembly while being adjusted as the vehicle seat is folded. However, many mechanisms do not adequately adjust the position of the head rest such that the headrest interferes with an object directly in front of the headrest, or it may interfere with the body of the vehicle. Thus, a vehicle occupant may not have the head restraint available when it is needed.

While current seat assembly design parameters has proven satisfactory for many vehicles, a need exists to develop a vehicle seat having an adjustable head restraint assembly that can be selectively positioned adjacent the occupant's head. It is also desirable to provide an adjustable head restraint assembly which cooperates with the seat back recliner mechanism to adjust the headrest when the seat back is folded forward adjacent the seat bottom.

SUMMARY OF THE INVENTION

The present invention provides a vehicle seat assembly having a seat bottom and a seat back connected to the seat bottom. A reclining mechanism is configured to adjustably position the seat back. A head restraint assembly includes a head restraint and one or more supports pivotally connected to and cooperating with the seat back to position the head restraint adjacent an occupant's head.

A headrest adjustment mechanism includes a spring connected to the one or more supports that biases the shaft from an unlocked toward a locked position. A release mechanism cooperating with the one or more supports which allows the one or more supports to be unlocked so that the headrest can be adjusted relative to the seat back.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 7 is a cross-sectional view of the locking member engaging a notch in the support shaft along line 7-7 of FIG. 6a;

DETAILED DESCRIPTION OF THE PREFERRED EMBODIMENT(S)

Figure 1:
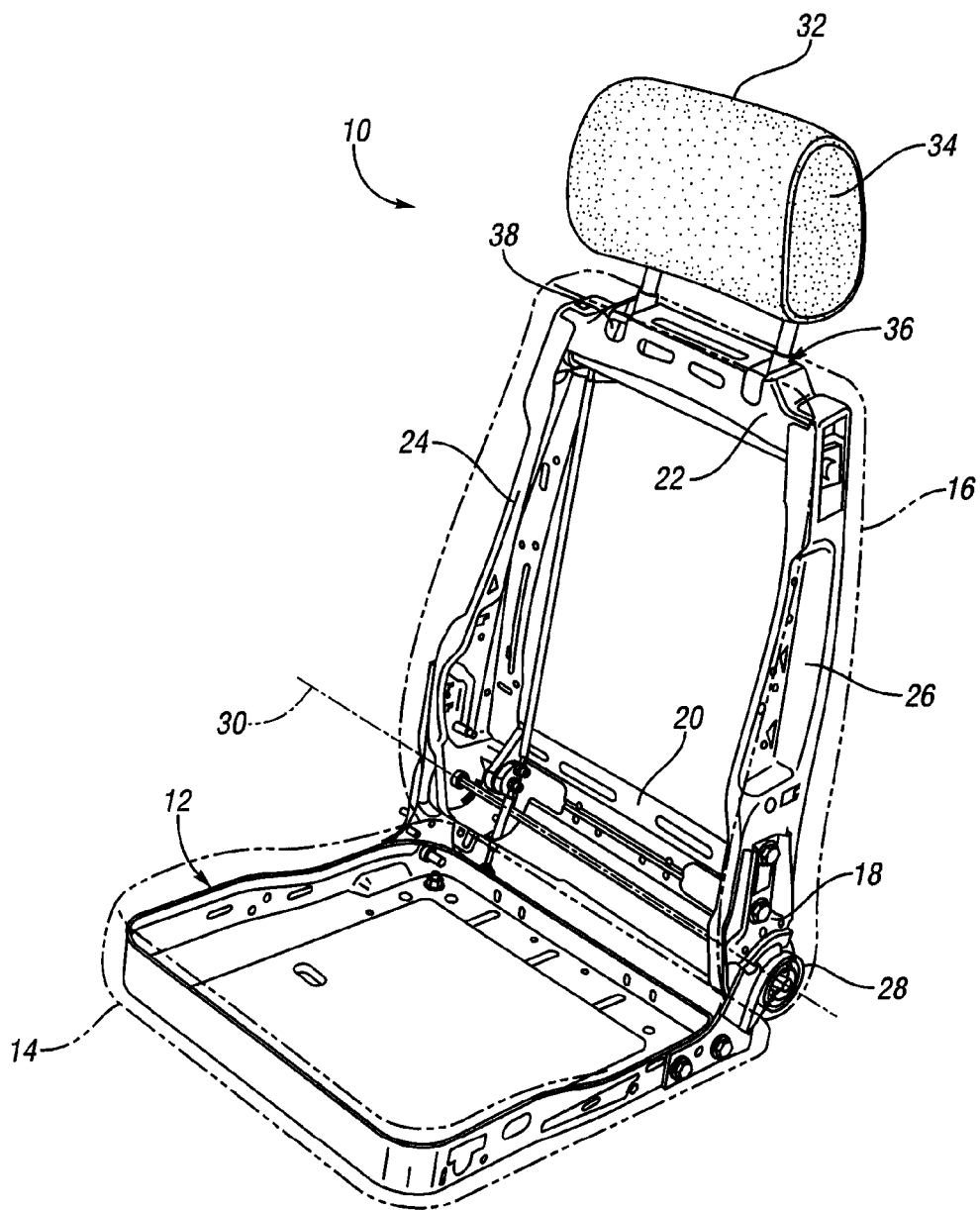
FIG. 1 is a perspective view of a seat assembly incorporating a seat back and head restraint assembly in accordance with the present invention.
Figure 5A:
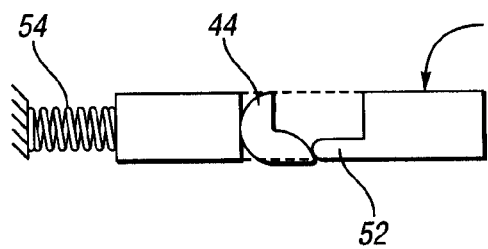
FIGS. 5a and 5b are cross-sectional views of a release mechanism and support shaft along line 5-5 of FIG. 4.
Figure 5B:
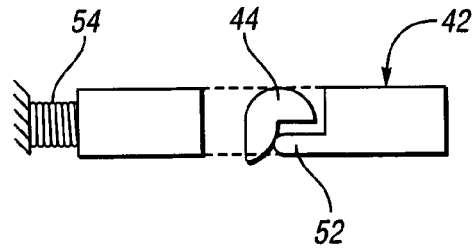

Referring now to the Figures, a vehicle seat for use in the passenger seating area of a motor vehicle in accordance with the present invention is disclosed. It is understood that the seat may be used in any portion of the vehicle passenger seating areas.

In the following description, various operating parameters and components are described for a number of constructed embodiments. These specific parameters and components are included as examples and are not meant to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring now to the Figures, a seat assembly configured for use in a vehicle, such as an automobile, boat or aircraft is shown and disclosed. As shown in FIG. 1, a vehicle seat assembly 10 is illustrated having a frame 12 including a seat bottom 14 and a seat back 16. Seat back 16 may be adjustably connected to the seat bottom by a reclining mechanism 18. Seat bottom 14 may be mounted directly to the vehicle floor or coupled to seat adjuster mechanisms or rails extending longitudinally to the vehicle floor enabling lateral and/or vertical movement of the seat bottom with respect to the vehicle floor.

Seat bottom 14 is conventional in design and can be constructed in accordance with any known manner, including a structural frame covered by a foam pad layer and outer finish cover material, or alternatively, with an elastomeric sock or sling. One or more manual or power adjustment mechanisms may also be provided to adjust the seat bottom or seat portions provided thereon to a number of positions. It is also understood that the seat may include one or more safety features including occupant restraint devices such as seatbelts.

Seat frame 12, including seat bottom 14 and seat back 16, is preferably formed from a lightweight material such as polycarbonate fiber or aluminum. However, it is understood that a variety of materials suitable for structural support of an occupant may also be used to create the seat frame. Seat back 16 includes a lower frame member 20, an upper frame member 22 and substantially vertical opposing side frame members 24, 26. Lower and upper frame members 20, 22 extend laterally to connect the opposing side frame members 24, 26. Frame members 20, 22, 24, 26 may be integrally formed or may be separate components that are joined in any suitable manner, such a by fasteners, adhesive or welding, to form seat back 16. Seat back 16 may have any suitable configuration.

Frame members 20, 22, 24, 26 cooperate with a seat back layer, such as an elastomeric sock or a structural frame covered by a pad layer and cover material, to support the occupant. Opposing side frame members 24, 26 are connected to seat bottom 12 by reclining mechanism 18. Reclining mechanism 18 extends laterally between the side frame members 24, 26 and cooperates with knob or handle 28, allowing an occupant to adjust the vertical orientation of the seat back 16 about a pivot axis 30. It is understood that a switch-activated electromechanical reclining mechanism may be coupled to the seat assembly.

Seat back 16 includes an adjustably connected head restraint or restraint assembly 32. Head restraint assembly 32 is moveably associated with the seat back 14. More specifically, the head restraint assembly 32 is moveable between a first position and at least one second position. The head restraint assembly 32 includes a headrest or head restraint pad 34 and one or more supports or headrest guides 36 extending to the head restraint through the upper frame member 22.

In one aspect of the present invention, head restraint supports or guides 36 allow for vertical and angular rotation of the head restraint pad 34 mounted thereon. In the embodiment shown in the Figures, the head restraint support 36 has a generally cylindrical shaped configuration. However, it is understood that a variety of support configurations may be used to accomplish the same functionality.

Figure 2:
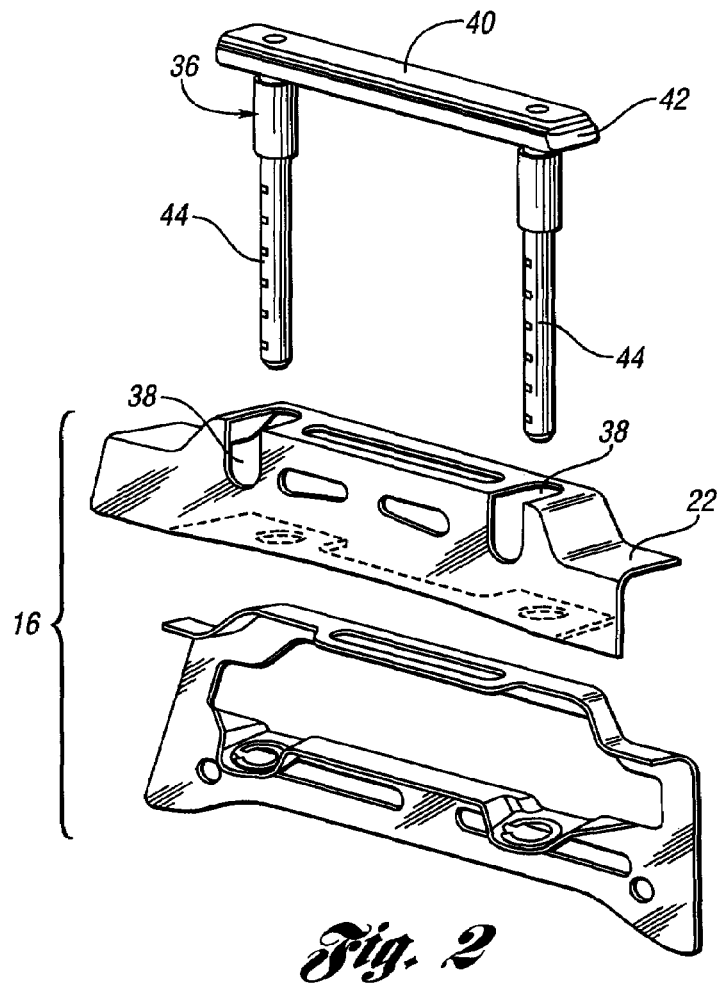
FIG. 2 is an exploded perspective view of the seat back and head restraint assembly.
Figure 3:
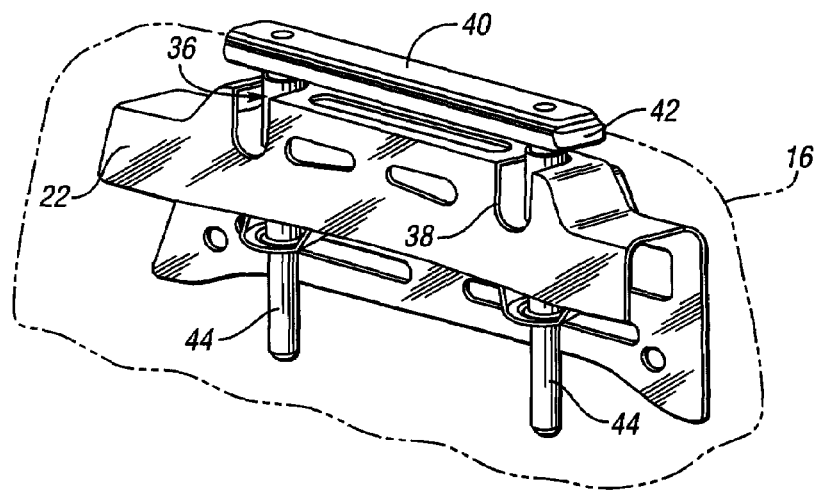
FIG. 3 is a perspective view of the seat back and head restraint assembly in accordance with the present invention.
Figure 4:
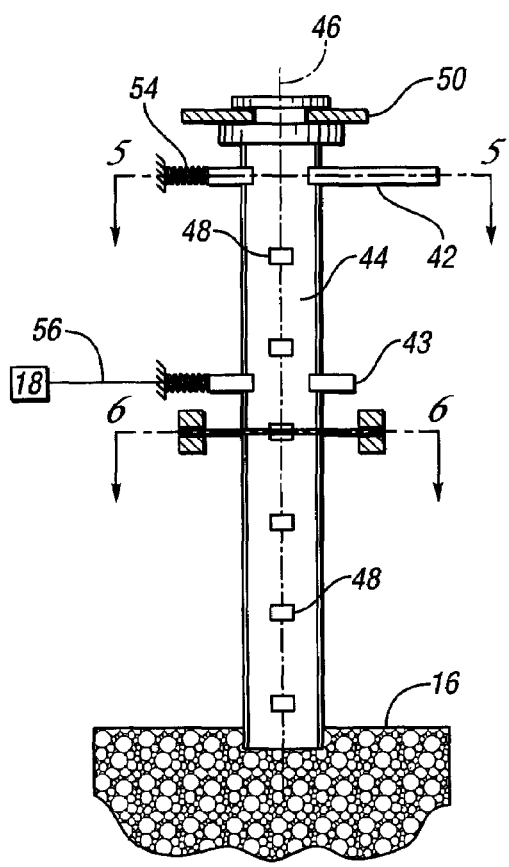
FIG. 4 is a side plan view of one or more support shafts of the headrest assembly of the present invention.

Referring now to FIGS. 2-4, head restraint assembly 32 is described in greater detail. Assembly 32 includes a headrest adjustment mechanism having one or more headrest guides 36 facilitating movement of the headrest relative to the seat back. One or more guides 36 include a first end extending through one or more slots 38 provided in the upper frame member 22 of the seat back 16 and a second end connected to member 40. It is contemplated that the one or more slots may be configured to allow the head rest 34 to move upward and/or forward to contact the head of an occupant. Slots 38 may also be configured to provide limit stops for the one or more headrest guides 36 as the guides 36 move through slots 38.

A release mechanism 42 cooperates with the one or more headrest guides or supports 36 to allow adjustment of the headrest assembly relative to the seat back 16. It is contemplated that the one or more support shafts may be formed as a single shaft or, alternatively a shaft extending through a cover to adjust the position of the headrest. In one aspect of the present invention, the one or more headrest guides includes a shaft 44 configured to rotate about a center axis 46 between a locked position, shown in FIG. 6a and an unlocked position, shown in FIG. 6b.

Shaft 44 includes a plurality of notches 48 formed on an outer surface that cooperate with and are releasably engaged by the release mechanism 42. In the embodiment shown in the Figures, a pair of shafts 44 cooperate to connect the headrest 34 to the seat back 16. Notches 48 are disposed on the exterior surfaces of each of the shafts 44 at equally spaced apart intervals so that the notches will align the headrest into position. However, it is understood that the same function can be completed with either a single support shaft or three or more shafts.

A spring 50 is disposed on an upper portion of shaft 44 biases the shaft 44 toward a locked position. Spring 50 can be of various forms, including a clock or coil spring having a first end connected to a fixed portion and an second end wrapped about the shaft. The tension in spring 50 operates to rotate shaft 44 back to a locked position after the shaft is placed in an unlocked position.

Referring now to FIGS. 4-7, a description of the adjustment of the headrest assembly 32 relative to the seat back 16 is described in greater detail. As is best shown in FIGS. 5a and 5b, release mechanism 42 may be used to overcome the biasing force of the spring shown in FIG. 4. The mechanism 42 includes a lever 52 that may slide perpendicular to the center axis to rotate the support shaft from the locked position shown in FIGS. 5a, 6a and 7 to the unlocked position shown in FIGS. 5b and 6b. It is also contemplated that mechanism 42 may be provided in other arrangements with the support shaft to accomplish the same objective.

The release mechanism 42 may be manually actuated by an occupant applying force against the end of the release mechanism. A biasing member 54 may cooperate with the release mechanism 42 to assist in the actuation of the mechanism. Alternatively, a cable, such as a Bowden cable, represented by line and reference number 56, may extend between mechanism 43 and the recliner mechanism 18 coupled to the seat back. Thus, when the recliner mechanism is operated, the cable actuates mechanism 43. This arrangement is contemplated where the cable may be configured to actuate the release lever and rotate the support shaft toward the unlocked position when the seat back is folded toward the seat bottom. It is also understood that the headrest assembly may include multiple release mechanisms described above.

It is understood that the locking mechanism can include one or more components on one or more support shafts. For example, the locking mechanism may include a button and at least one cooperating spring. The one or more springs provide both the locking force and locking tab. The headrest assembly can be adjusted upward or downward simply by depressing the button inwards to rotate the shaft to an unlocked position. This inward pressure will let the headrest assembly move freely up or down, subject to inclusion of various aspects of the invention described below.

Figure 7:
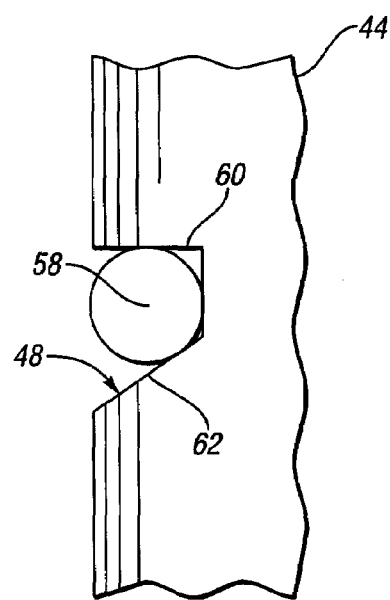
Figure 6A:
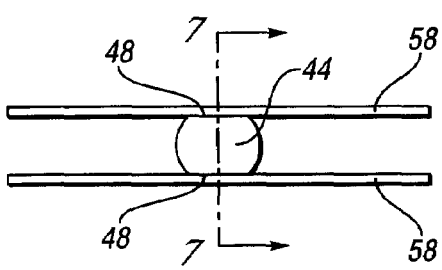
FIGS. 6a and 6b are cross-sectional views of locking members disposed around the support shaft along line 6-6 of FIG. 4.
Figure 6B:
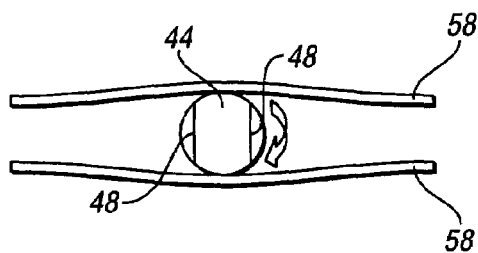

As is best shown in FIGS. 6a, 6b and 7, one or more locking members 58 extend along opposite sides of the shaft 44. In one aspect of the present invention shown in the locked position in FIG. 6a, a pair of locking members, such as spring wires, engage a pair of notches 48 on the shaft 44 to inhibit movement of the headrest relative to the seat back. As shown in FIG. 7, notches 48 generally include a locking surface 60 and a receiving surface 62. Receiving surface 62 may be formed with an angled face to allow the locking members to move from an exterior surface of the shaft toward an inner surface. Locking surface 60 may include a flat surface that cooperates with the angled receiving surface to receive and engage the locking members 58.

In the unlocked position shown in FIG. 6b, the release mechanism causes locking members 58 to disengage the notches 48 on shaft 44, allowing the biasing force of spring to rotate the shaft 44 90 degrees about the center axis. When this occurs, the notches 48 do not engage the locking members 58, thereby permitting downward movement of the headrest toward the upper portion of the seat back.

Figure 8:
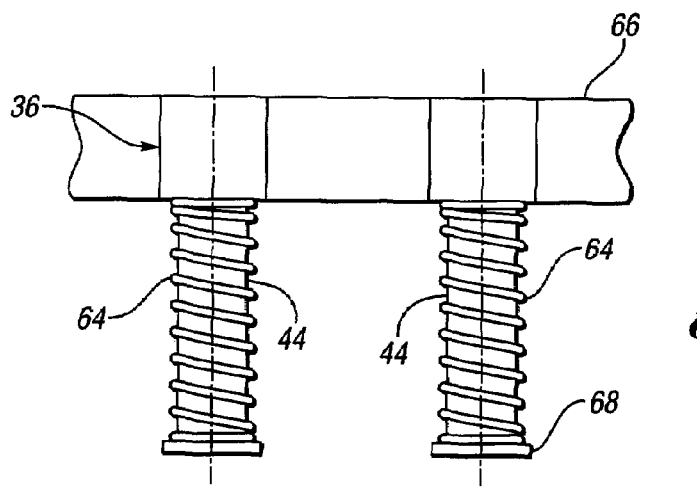
FIG. 8 is a sectional view of one aspect of a headrest adjustment system used with the headrest assembly.
Figure 9:
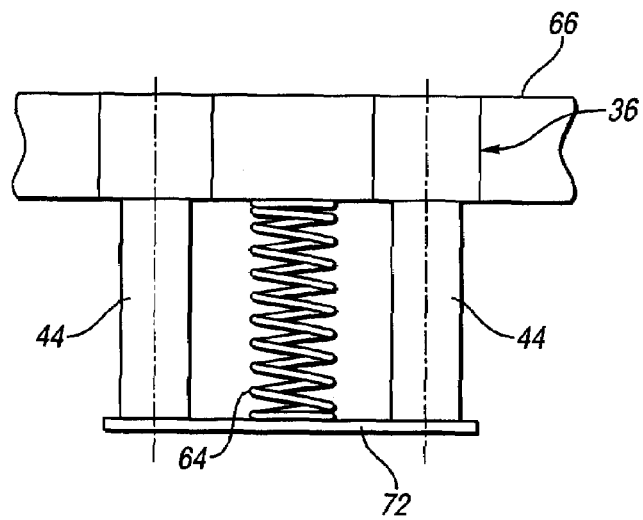
FIG. 9 is a sectional view of another aspect of a headrest adjustment system used with the headrest assembly.
Figure 10:
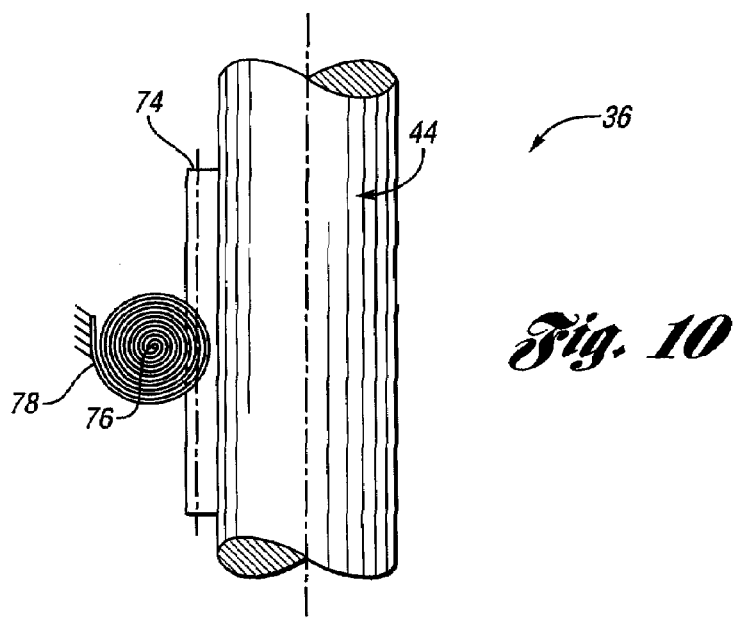
FIG. 10 is a side elevational view of yet another aspect of a headrest adjustment system used with the headrest assembly in accordance with the present invention.

Referring now to FIGS. 8-10, when the support shaft of the one or more headrest guides or supports is placed in an unlocked position, the headrest assembly may be moved or biased downward toward the seat back. While it is contemplated that the headrest assembly will move downward as a result of the unsupported weight of the headrest, the velocity of movement may be controlled by coupling a mechanism to cooperate with the support shafts.

FIG. 8 illustrates one aspect of the present invention. Coupling mechanism include a compression member or spring 64 is disposed around the one or more support shafts 44. In the aspect illustrated in FIG. 8, a compression member 64 is provided around each of a pair of support shafts 44. Compression members 64 extend between the headrest frame 68 and an upper portion of seat back, such as the seat back frame 66.

Another aspect of the present invention is shown in FIG. 9. A single compression member 64 is disposed between a pair of support shafts 44. It is understood that the single compression member may be disposed in any position between the seat back frame and upper seat back. A mounting member 72 extends between support shafts 44 and engages a lower end of the compression member to support and cooperate in the compression of the spring 64.

It is understood that a variety of mechanisms may be used to perform a similar function. For example, a hydraulic or pneumatic system may cooperate with the one or more supports to assist in the adjustment of the headrest relative to the seat back. Alternatively, as shown in FIG. 10, a rack and pinion style mechanism may be coupled to the one or more restraint supports to adjust the position of the headrest as a compression member. As illustrated in FIG. 10, the exterior surface of support shaft 44 includes a rack 74 configured to engage a gear 76 rotatable thereon. The pinion gear 76 engages the teeth of the rack 74 and is adapted to rotate about an axis of rotation. A coil spring or similar device 78 is provided with the pinion gear 76 that biases the pinion gear to drive the headrest downward at a controlled rate.

Extension of the headrest assembly upward relative to the upper portion of the seat back are based on tolerance limits typically defined by design choices. For example, in one aspect of the present invention, the support shafts are designed to allow a travel length of about 200 millimeters to accommodate a wide range of occupant heights. However, it is understood that the present invention may be used with a wide range of seating configurations and accept tolerances exceeding or limiting the preferred range.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly for supporting an occupant, the assembly comprising:
   a seat bottom;
   a seat back connected to the seat bottom having a frame including an upper frame member;
   a reclining mechanism configured to adjustably position the seat back; and
   a head restraint assembly adjustably connected to the seat back, the head restraint assembly including a head restraint and a head restraint adjustment mechanism having one or more supports pivotally connected to and cooperating with the seat back to position the head restraint adjacent an occupant's head and one or more compression members extending between the head restraint and the seat back to control the movement of the head restraint relative to the seat back,
   wherein the head restraint adjustment mechanism includes a spring connected to each of one or more supports shafts of the one or more supports that biases the one or more support shafts from an unlocked toward a locked position and a release mechanism having a member that cooperates with the reclining mechanism to adjustably position the head restraint when the reclining mechanism is activated to position the seat back adjacent the seat bottom and cooperating with the one or more support shafts which allows the one or more support shafts to be unlocked so that the head restraint can be adjusted relative to the seat back.

2. The vehicle seat assembly of claim 1 wherein the one or more support shafts further comprise a pair of opposing support shafts extending between and operably connected to the seat back frame and head restraint.

3. The vehicle seat assembly of claim 1 wherein the one or more support shafts include a plurality of notches formed thereon that are releasably engaged by the release mechanism.

4. The vehicle seat assembly of claim 3 wherein the notches are disposed on an exterior surface of the one or more support shafts at equally spaced intervals to provide head restraint mounting positions.

5. The vehicle seat assembly of claim 1 wherein the release mechanism includes a lever that engages the one or more support shafts to rotate the shafts from a locked position to an unlocked position and a biasing member coupled between the lever and a button such that an occupant can manually release the one or more support shafts to adjust the head restraint relative to the seat back.

6. The vehicle seat assembly of claim 1 wherein the release mechanism includes one or more locking members extending along opposing sides of the one or more support shafts that inhibits movement of the head restraint relative to the seat back.

7. A vehicle seat assembly comprising:
   a seat bottom;
   a seat back connected to the seat bottom having a frame including an upper frame member;
   a reclining mechanism configured to adjustably position the seat back;
   a head restraint extending above and adjustably connected to the seat back frame; and
   a head restraint adjustment mechanism cooperating with the head restraint to position the head restraint adjacent an occupant's head, the head restraint adjustment mechanism including a pair of shafts extending between and pivotally connected to the head restraint and the seat back, a spring connected to each of the pair of shafts that biases the shafts from an unlocked position toward a locked position and a release mechanism cooperating with the shafts which allows the shafts to be unlocked so that the head restraint can be adjusted relative to the seat back, wherein the pair of shafts each further include a plurality of notches formed on an exterior surface of the shaft at equally spaced intervals to provide head restraint mounting positions that are releasably engaged by the release mechanism.

8. The vehicle seat assembly of claim 7 wherein the release mechanism includes a member that cooperates with the reclining mechanism to adjustably position the head restraint when the reclining mechanism is activated to position the seat back adjacent the seat bottom.

9. The vehicle seat assembly of claim 7 wherein the release mechanism includes a lever that engages the shafts to rotate the shafts from a locked position to an unlocked position and a biasing member coupled between the lever and a button such that an occupant can manually release the shafts to adjust the head restraint relative to the seat back.

10. The vehicle seat assembly of claim 7 wherein the release mechanism includes one or more locking members extending along opposing sides of the shafts that inhibits movement of the head restraint relative to the seat back.

11. The vehicle seat assembly of claim 7 wherein the head restraint adjustment mechanism further comprises one or more compression members extending between the head restraint and the seat back to control the downward movement of the head restraint relative to the seat back.

12. A seat back and head restraint assembly configured for use with a vehicle seat having a seat bottom, the assembly comprising:

a seat back frame including an upper frame member;

a reclining mechanism configured to adjustably position the seat back;

a head restraint extending above the seat back frame;

a pair of shafts extending between and pivotally connected to the head restraint and the seat back, wherein a plurality of notches are formed on an exterior surface of each shaft at equally spaced intervals to provide the head restraint mounting position;

a spring connected to each of the pair of shafts that biases the shaft from an unlocked position toward a locked position; and a release mechanism cooperating with and releasably engaging one or more notches of the pair of shafts so that the head restraint can be adjusted relative to the seat back.

13. The assembly of claim 12 wherein the release mechanism includes a member that cooperates with the reclining mechanism to adjustably position the head restraint when the reclining mechanism is activated to position the seat back adjacent the seat bottom.

14. The assembly of claim 12 wherein the release mechanism includes a lever that engages the shafts to rotate the shafts from a locked position to an unlocked position and a biasing member coupled between the lever and a button such that an occupant can manually release the shafts to adjust the head restraint relative to the seat back.

15. The assembly of claim 12 wherein the release mechanism includes one or more locking members extending along opposing sides of the shafts that inhibits movement of the head restraint relative to the seat back.

16. The assembly of claim 12 wherein the release mechanism further comprises one or more compression members extending between the head restraint and the seat back to control the downward movement of the head restraint relative to the seat back.

* * * * *